(12) United States Patent
Konstadinidis et al.

(10) Patent No.: US 7,711,452 B2
(45) Date of Patent: May 4, 2010

(54) CHARACTERIZING VIBRATIONAL HEALTH IN COMPUTER SYSTEMS WITH VARIABLE COMPONENT CONFIGURATIONS

(75) Inventors: Georgios K. Konstadinidis, San Jose, CA (US); Kenny C. Gross, San Diego, CA (US); Keith A. Whisnant, La Jolla, CA (US)

(73) Assignee: Oracle America, Inc., Redwood Shores, CA (US)

( * ) Notice: Subject to any disclaimer, the term of this patent is extended or adjusted under 35 U.S.C. 154(b) by 170 days.

(21) Appl. No.: 11/876,634

(22) Filed: Oct. 22, 2007

(65) Prior Publication Data

US 2009/0105885 A1 Apr. 23, 2009

(51) Int. Cl.
*G05D 19/02* (2006.01)
*G05D 19/00* (2006.01)

(52) U.S. Cl. .......................... 700/280; 73/579; 73/658; 702/75; 702/76; 702/77; 720/679; 324/312

(58) Field of Classification Search .................. 700/280; 73/579; 720/679; 324/312; 702/75–77; 361/679.34
See application file for complete search history.

(56) References Cited

U.S. PATENT DOCUMENTS

| | | | | |
|---|---|---|---|---|
| 5,631,427 A | * | 5/1997 | Bridges | ........................ 73/658 |
| 6,392,833 B1 | * | 5/2002 | Wood et al. | ............... 360/73.03 |
| 2002/0038188 A1 | * | 3/2002 | Fioravanti | ..................... 702/75 |
| 2004/0165406 A1 | * | 8/2004 | Gauthier et al. | ............... 363/39 |
| 2005/0111125 A1 | * | 5/2005 | Chung | .......................... 360/31 |
| 2008/0106823 A1 | * | 5/2008 | Yao | .......................... 360/294.4 |

OTHER PUBLICATIONS

Pres Inc, http://www.pres-inc.com/System-Services/PRES-Inc-one-page-brochure.pdf, Sentry System, pp. 1-2, 2006.*
Hem Data, http://hemdata.com/content/products/smfa32.pdf, Snap-Master for Windows, pp. 1-9.*

* cited by examiner

*Primary Examiner*—Ramesh B Patel
*Assistant Examiner*—Olvin Lopez
(74) *Attorney, Agent, or Firm*—Park, Vaughan & Fleming LLP

(57) ABSTRACT

One embodiment of the present invention provides a system that efficiently conducts vibrational characterizations for a computer system having variable component configurations. During operation, the system receives a given component configuration associated with the computer system. Next, the system looks up the given component configuration in a resonant spectra library, which contains structural resonant frequencies for a number of possible component configurations for the computer system. If the given component configuration is found in the resonant spectra library, the system retrieves a set of structural resonant frequencies associated with the given component configuration. The system subsequently controls one or more vibration sources within the computer system to avoid the set of structural resonant frequencies.

24 Claims, 2 Drawing Sheets

CHARACTERIZING VIBRATIONAL HEALTH IN COMPUTER SYSTEMS WITH VARIABLE COMPONENT CONFIGURATIONS

BACKGROUND

1. Field of the Invention

Embodiments of the present invention relate to techniques for improving the vibrational health of computer systems. More specifically, embodiments of the present invention relate to techniques for efficiently characterizing the vibrational health of computer systems with variable internal configurations.

2. Related Art

Computer systems such as servers and storage arrays can be adversely affected by mechanical vibrations of system internal components and structures. In particular, when structural resonances are present in servers or storage arrays at some characteristic frequencies, it is likely that internal system fans or disk drives operate at some rotational frequencies that are substantially the same as one of the structural resonant frequencies. When this condition occurs, the rotational motions of the fans or the disk drives can excite a structural resonance within the computer system's mechanical structure, thereby causing destructive amplification of internal vibrations. The amplified internal vibrations can subsequently lead to degradation of throughput to hard drives, and can also accelerate other mechanical failure mechanisms.

Note that the above-described vibrational problems are becoming more significant because of the following trends in computer system manufacturing: (1) cooling fans are becoming increasingly more powerful; (2) chassis and support structures are becoming weaker because of design modifications that reduce cost and weight; and (3) internal disk drives, power supplies, and other system components are becoming more sensitive to vibration-induced degradation. Consequently, it is highly desirable to characterize the vibrational health of a computer system to identify and avoid these structural resonant frequencies.

One technique for characterizing the vibrational health of a computer system involves running a "swept sine" test on the computer system. During a swept sine test, a small vibration at a controlled frequency is generated on the computer system. This controlled frequency is swept from high values (typically from 700 KHz to 900 KHz) down to very low values (typically from 5 Hz to 10 Hz). The amplitudes of vibrations are subsequently measured at one or more locations inside the computer system, and vibration patterns are obtained to determine the existence of structural resonant frequencies. After the resonant frequencies are identified, the system can control the fan speeds or other rotational components so that the rotational frequencies do not coincide with any of the resonance frequencies.

Conventionally, the swept sine testing is performed by shipping the computer system to a facility that has a programmable shake table. Recently, a new technique has been proposed to install a built-in vibration generator inside each computer system (see U.S. patent application Ser. No. 11/787,782, entitled, "BUILT-IN SWEPT-SINE TESTING FOR A COMPUTER SYSTEM TO ASSURE VIBRATIONAL INTEGRITY," filed on 17 Apr. 2007 by inventors Kenny C. Gross, et al.). Using this technique, it is possible to conduct the swept sine testing even when the computer system remains in the field.

Note that a computer system may have been characterized for vibrational health at the time of manufacture and may be certified to be free of amplifying resonances. However, during the lifetime of the computer system, the customer may upgrade or modify the internal configuration of the computer system, for example by upgrading memory, swapping system board, adding hard disks, or removing components that are no longer needed. Note that any of these component configuration changes can change the internal mass distribution within the computer system, thereby causing structural resonant frequencies to shift, or causing new resonant frequencies to be created. Hence, it is desirable to be able to identify structural resonant frequencies whenever the computer system has been reconfigured.

Unfortunately, it is not practical to ship a computer system to a facility with a shake table to perform a new vibrational health characterization each time that a customer upgrades or swaps internal components. Furthermore, even if a computer system is equipped with the built-in vibrational characterization capability, it is still desirable to minimize the number of times that vibrational health needs to be characterized.

Hence, what is needed is a method and an apparatus that facilitates efficient characterization of the vibrational health of a computer system for a number of internal configurations without the above-described issues.

SUMMARY

One embodiment of the present invention provides a system that efficiently conducts vibrational characterizations for a computer system having variable component configurations. During operation, the system receives a given component configuration associated with the computer system. Next, the system looks up the given component configuration in a resonant spectra library, which contains structural resonant frequencies for a number of possible component configurations for the computer system. If the given component configuration is found in the resonant spectra library, the system retrieves a set of structural resonant frequencies associated with the given component configuration. The system subsequently controls one or more vibration sources within the computer system to avoid the set of structural resonant frequencies.

In a variation on this embodiment, if the given component configuration is not found in the resonant spectra library, the system identifies a set of structural resonant frequencies associated with the given component configuration. Next, the system generates a new entry in the resonant spectra library for the given component configuration, wherein the new entry contains the identified structural resonant frequencies. The system subsequently controls one or more vibration sources within the computer system to avoid the identified structural resonant frequencies.

In a further variation on this embodiment, the resonant spectra library is stored locally on the computer system.

In a further variation on this embodiment, the resonant spectra library is stored remotely on a centralized server to allow a plurality of computer systems to access the resonant spectra library.

In a further variation on this embodiment, the system identifies the set of structural resonant frequencies by performing an in-situ vibration characterization for the computer system having the given component configuration.

In a further variation, the system performs the in-situ vibration characterization by performing a swept sine test using a built-in vibration generator in the computer system.

In a variation on this embodiment, the vibration sources can include: one or more fans within the computer system; one or more hard disk drives within the computer system; and one or more tape drives within the computer system.

In a further variation, the system controls the one or more vibration sources within the computer system by controlling the rotational speeds of the vibration sources so that they are different from the identified structural resonant frequencies of the computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

Figure 1:
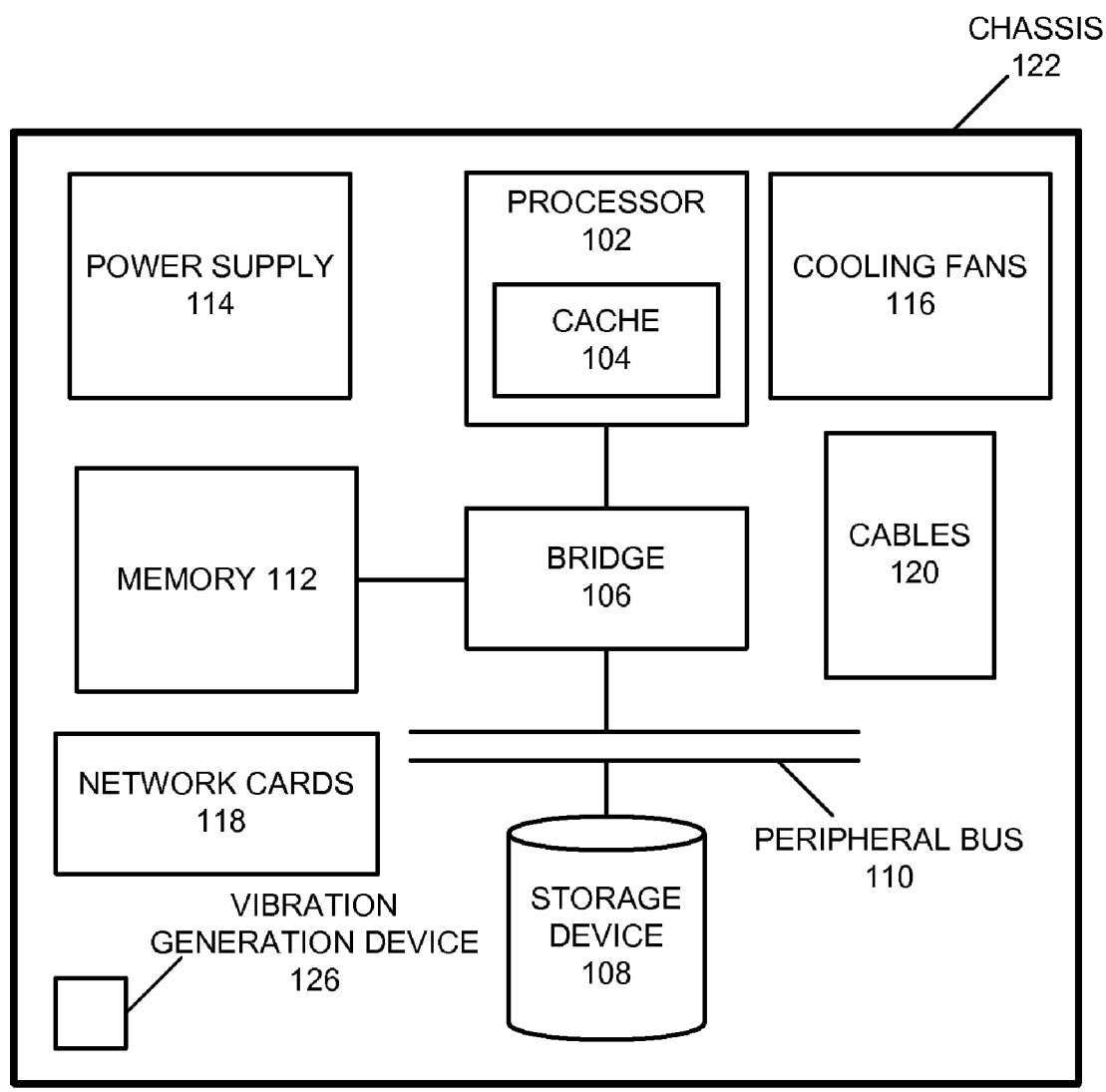
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance, and any other processor now known or later developed. Furthermore, processor 102 can include one or more cores. Processor 102 includes a cache 104 that stores code and data for execution by processor 102.

Although FIG. 1 illustrates computer system 100 with one processor, computer system 100 can include more than one processor. In a multi-processor configuration, the processors can be located on a single system board, or on multiple system boards.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory. In particular, storage device 108 can include one or multiple hard disk drives (HDDs), or an HDD array.

Processor 102 communicates with memory 112 through bridge 106. Memory 112 can include any type of memory that can store code and data for execution by processor 102. This includes but not limited to, dynamic random access memory (DRAM), static random access memory (SRAM), flash memory, read only memory (ROM), and any other type of memory now known or later developed. Note that processor 102, cache 104, bridge 106, peripheral bus 110 and memory 112 are typically located on a system board/motherboard (not shown).

Computer system 100 also includes other system components, which include, but are not limited to power supply 114, one or more cooling fans 116, network cards 118, and cables 120 that interconnect system components. Furthermore, computer system 100 is enclosed by chassis 122, which provides housing and mechanical supports for the aforementioned computer system components. Note that cooling fans 116 can generate a significant amount of mechanical vibrations during normal operation.

In some embodiments of the present invention, computer system 100 also includes a vibration-generation device 126, which is a transducer that accepts an input signal and outputs mechanical vibrations. In one embodiment, the frequency of the mechanical vibrations varies according to the magnitude of an input voltage.

Note that computer system 100 is associated with a specific internal component configuration (or "component configuration" hereafter) which is decided when computer system 100 is manufactured. This component configuration in conjunction with other mechanical structures (such as chassis 122) of computer system 100, determines the mechanical vibrational characteristic (or "vibrational characteristic" hereafter) of computer system 100. This vibrational characteristic can include one or more structural resonant frequencies (or "resonant frequencies" hereafter) associated with computer system 100. However, when the component configuration is changed during the life of computer system 100 due to a number of reasons described above, the vibrational characteristic can change as well.

Note that although the present invention is described in the context of computer system 100 as illustrated in FIG. 1, the present invention can generally be applied to any type of computing system that is subject to vibrational health issues. Hence, the present invention is not limited to the specific implementation of computer system 100 as illustrated in FIG. 1.

Resonant Spectra Library

In one embodiment of the present invention, the system maintains a library of resonant spectra for different component configurations of computer system 100. We refer to this library as a "resonant spectra library." In one embodiment, the resonant spectra library is configured in the form of a compressed spectra library.

In one embodiment of the present invention, when computer system 100 is first manufactured, a vibrational characterization is performed to identify one or more resonant frequencies associated with the given component configuration of computer system 100. The techniques for performing the vibrational characterization can include a shake table test or a built-in vibrational characterization. We refer to these identified resonant frequencies as the resonant spectrum for computer system 100. This newly identified resonant spectrum is subsequently stored in the resonant spectra library, and linked exclusively to the given component configuration. Hence, the resonant spectrum can be located and retrieved from the library when a query including the associated component configuration is provided.

In one embodiment of the present invention, a resonant spectra library can be built a priori for a given computer system platform by producing resonant spectra for a large number of possible permutations of component configurations.

In one embodiment of the present invention, the resonant spectra library is a local spectra library which is stored in a solid-state memory on computer system 100. For example, the local spectra library may be stored in a flash-memory based storage device associated with computer system 100, such as a flash-based disk-on-chip. In another embodiment, the local spectra library may be stored in a protected region on an HDD within computer system 100.

In a further embodiment of the present invention, the resonant spectra library is stored remotely on a centralized server system to allow a plurality of computer systems to access the resonant spectra in the resonant spectra library. Note that the centralized resonant spectra library also allows distributed computer systems to upload new resonant spectra associated with component configurations that do not already exist in the library. For example, the newly identified resonant spectrum for computer system 100 can be added into the remote resonant spectra library by uploading the resonant spectrum onto the centralized server storing the resonant spectra library.

In a further embodiment of the present invention, the newly identified resonant spectrum for computer system 100 is both stored in a local resonant spectra library on computer system 100 and in a remote spectra library on a centralized server system. In this embodiment, the newly identified resonant spectrum for computer system 100 can be quickly retrieved by computer system 100 from its local library when needed, and at the same time can also be accessed by other computer systems.

In one embodiment of the present invention, whenever the component configuration of computer system 100 changes, for example, due to service actions or customer upgrades of storage devices, a system program is executed to perform a configuration discovery. This configuration discovery operation determines if the new component configuration has been previously characterized and stored in the resonant spectra library. In one embodiment, the configuration discovery operation is performed at the end of the boot-up process following the component configuration change.

In one embodiment of the present invention, the configuration discovery operation looks up the new component configuration in a local resonant spectra library on computer system 100. If the new component configuration is found in the local library, the associated resonant spectrum is retrieved.

In a further embodiment of the present invention, the configuration discovery operation looks up the new component configuration in a remote resonant spectra library on a server system. If the new component configuration is found in the remote library, the associated resonant spectrum is then retrieved.

In a further embodiment of the present invention, the configuration discovery operation first looks up the new component configuration in a local resonant spectra library on computer system 100. If the new component configuration is found in the local library, the associated resonant spectrum is then retrieved from the local library. If the new component configuration is not found in the local library, the discovery operation next looks up a remote resonant spectra library on a server system. If the new component configuration is found in the remote library, the associated resonant spectrum is then retrieved from the remote library.

In one embodiment of the present invention, if the new component configuration does not already exist in a resonant spectra library, the system subsequently performs a new vibrational characterization to identify resonant frequencies for the new component configuration. In one embodiment, this vibrational characterization can be conducted during the boot-up process following the component configuration change. In this embodiment, the boot-up process is lengthened to allow this characterization to be conducted.

For example, following the configuration change, an in-situ swept sine test is conducted using the built-in vibration generation device 126 which resides within computer system 100. Specifically, when performing this swept sine test, the voltage input into vibration-generation device 126 can be swept through a range of voltages to produce a vibrational frequency range known to encompass the rotational frequencies of all components (fans, disk drives, tape drives, etc.) in computer system 100. During the sweep, vibration-generation device 126 can also be configured to simulate vibrational frequencies that arise from "beat" phenomena (which can occur when two devices have close rotational frequencies).

When the new resonant spectrum has been generated, it can be stored into a local resonant spectra library, or stored into a remote resonant spectra library, or both. This new resonant spectrum can now be used to ensure that fan speeds and other rotational frequencies of system components do not intersect the resonant frequencies of computer system 100.

Characterizing Vibrational Health Using a Resonant Spectra Library

Figure 2:
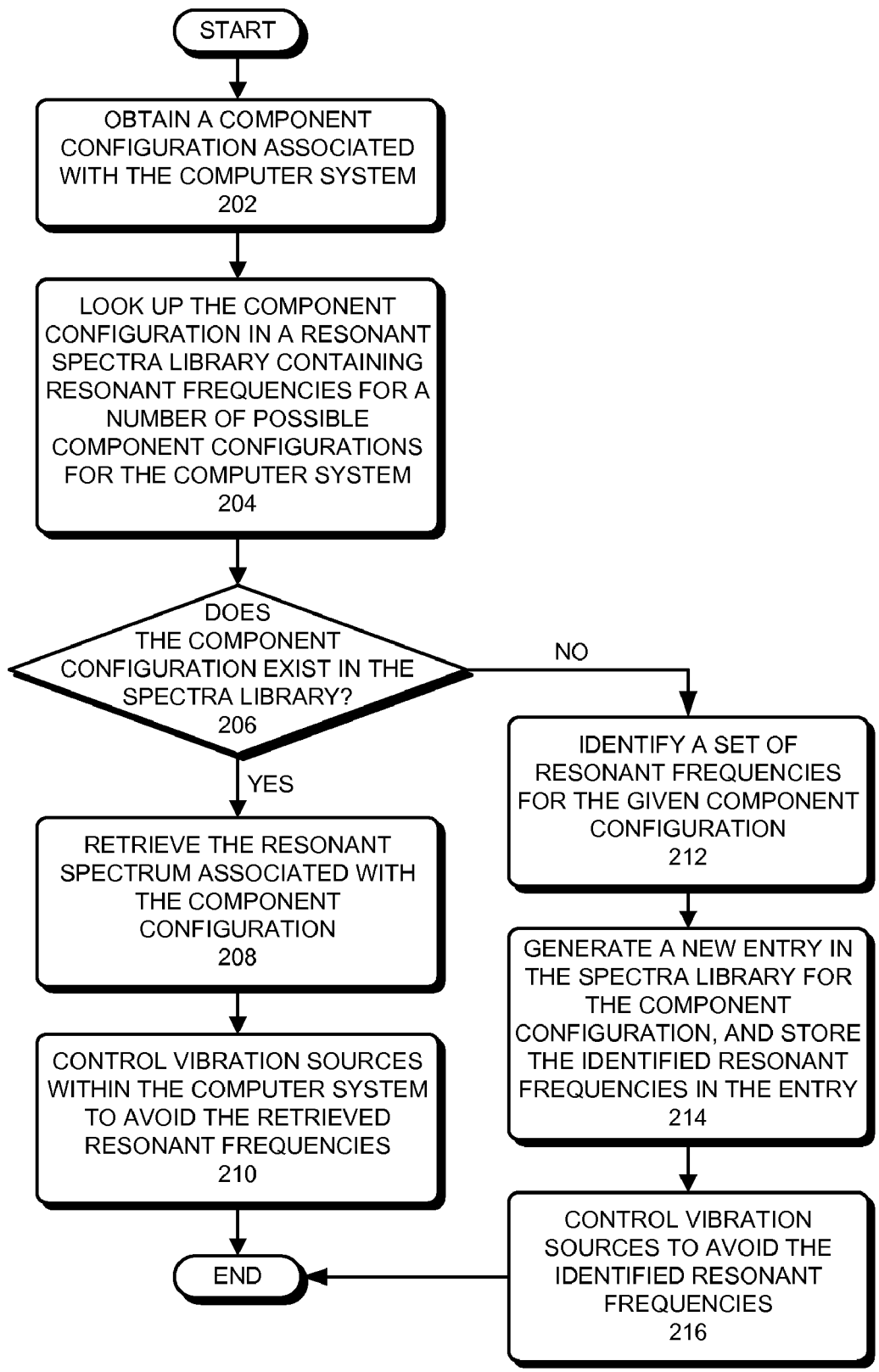
FIG. 2 presents a flowchart illustrating the process of performing efficient vibrational characterizations for a computer system in accordance with embodiments of the present invention.

FIG. 2 presents a flowchart illustrating the process of performing efficient vibrational characterization for a computer system in accordance with embodiments of the present invention.

During operation, the system obtains a component configuration associated with the computer system (step 202). Note that this component configuration may be different from the original component configuration when the computer system was first manufactured.

Next, the system looks up the component configuration in a resonant spectra library, which contains structural resonant frequencies for a number of possible component configurations for the computer system (step 204). Note that the resonant spectra library can be stored locally on the computer system and/or stored remotely on a centralized server to allow a plurality of computer systems to access the resonant spectra library.

The system then determines if the component configuration already exists in the resonant spectra library (step 206). If so, the system retrieves the resonant spectrum comprising a set of resonant frequencies associated with that component configuration (step 208). The system subsequently controls one or more vibration sources within the computer system so that the operational frequencies of these vibration sources do not intersect the retrieved resonant frequencies (step 210).

On the other hand, if the system determines that the component configuration does not exist in the resonant spectra library, the system identifies a set of resonant frequencies for the computer system having the given component configuration (step 212). For example, the system identifies the set of resonant frequencies by performing an in-situ vibration characterization of a computer system having the given component configuration. Next, the system generates a new entry in the resonant spectra library for the given component configuration, and stores the identified resonant frequencies as the resonant spectrum in the new entry in the library (step 214). The system then controls one or more vibration sources within the computer system so that the operational frequencies of these vibration sources do not intersect the identified resonant frequencies associated with the given component configuration (step 216).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for efficiently conducting vibrational characterizations for a computer system, the method comprising:
using at least one computer for:
receiving a given component configuration associated with the computer system;
looking up the given component configuration in a resonant spectra library to determine if the given component configuration has been previously characterized and stored in the resonant spectra library, wherein the resonant spectra library includes structural resonant frequencies for one or more component configurations for the computer system; and
if the given component configuration is found in the resonant spectra library,
retrieving a set of structural resonant frequencies associated with the given component configuration; and
controlling one or more vibration sources within the computer system to avoid the set of structural resonant frequencies.

2. The method of claim 1, wherein if the given component configuration is not found in the resonant spectra library, the method further comprises:
identifying a set of structural resonant frequencies associated with the given component configuration;
generating a new entry in the resonant spectra library for the given component configuration, wherein the new entry contains the identified structural resonant frequencies; and
controlling one or more vibration sources within the computer system to avoid the identified structural resonant frequencies.

3. The method of claim 2, wherein the resonant spectra library is stored locally on the computer system.

4. The method of claim 2, wherein the resonant spectra library is stored remotely on a centralized server to allow a plurality of computer systems to access the resonant spectra library.

5. The method of claim 2, wherein identifying the set of structural resonant frequencies involves performing an in-situ vibration characterization for the computer system having the given component configuration.

6. The method of claim 5, wherein performing the in-situ vibration characterization involves performing a swept sine test using a built-in vibration generator in the computer system.

7. The method of claim 1, wherein the vibration sources include one or more of the following:
one or more fans within the computer system;
one or more hard disk drives within the computer system; and
one or more tape drives within the computer system.

8. The method of claim 2, wherein controlling the one or more vibration sources within the computer system involves controlling the rotational speeds of the vibration sources to be different from the identified structural resonant frequencies of the computer system.

9. A computer readable storage medium storing instructions that when executed by a computer cause the computer to perform a method for efficiently conducting vibrational characterizations for a computer system, the method comprising:
receiving a given component configuration associated with the computer system;
looking up the given component configuration in a resonant spectra library to determine if the given component configuration has been previously characterized and stored in the resonant spectra library, wherein the resonant spectra library includes structural resonant frequencies for one or more component configurations for the computer system; and
if the given component configuration is found in the resonant spectra library,
retrieving a set of structural resonant frequencies associated with the given component configuration; and
controlling one or more vibration sources within the computer system to avoid the set of structural resonant frequencies.

10. The computer readable storage medium of claim 9, wherein if the given component configuration is not found in the resonant spectra library, the method further comprises:
identifying a set of structural resonant frequencies associated with the given component configuration;
generating a new entry in the resonant spectra library for the given component configuration, wherein the new entry contains the identified structural resonant frequencies; and
controlling one or more vibration sources within the computer system to avoid the identified structural resonant frequencies.

11. The computer readable storage medium of claim 10, wherein the resonant spectra library is stored locally on the computer system.

12. The computer readable storage medium of claim 10, wherein the resonant spectra library is stored remotely on a centralized server to allow a plurality of computer systems to access the resonant spectra library.

13. The computer readable storage medium of claim 10, wherein identifying the set of structural resonant frequencies involves performing an in-situ vibration characterization for the computer system having the given component configuration.

14. The computer readable storage medium of claim 13, wherein performing the in-situ vibration characterization involves performing a swept sine test using a built-in vibration generator in the computer system.

15. The computer readable storage medium of claim 9, wherein the vibration sources include one or more of the following:
one or more fans within the computer system;
one or more hard disk drives within the computer system; and
one or more tape drives within the computer system.

16. The computer readable storage medium of claim 10, wherein controlling the one or more vibration sources within the computer system involves controlling the rotational speeds of the vibration sources to be different from the identified structural resonant frequencies of the computer system.

17. An apparatus that efficiently conducts vibrational characterizations for a computer system, comprising:

a receiving mechanism configured to receive a given component configuration associated with the computer system;

a lookup mechanism configured to look up the given component configuration in a resonant spectra library and to determine if the given component configuration has been previously characterized and stored in the resonant spectra library, wherein the resonant spectra library includes structural resonant frequencies for one or more component configurations for the computer system; and a retrieving mechanism configured to retrieve a set of structural resonant frequencies associated with the given component configuration if the given component configuration is found in the resonant spectra library; and a control mechanism configured to control one or more vibration sources within the computer system to avoid the set of structural resonant frequencies.

18. The apparatus of claim 17, further comprising:

an identification mechanism configured to identify a set of structural resonant frequencies associated with the given component configuration if the given component configuration is not found in the resonant spectra library; and a generation mechanism configured to generate a new entry in the resonant spectra library for the given component configuration, wherein the new entry contains the identified structural-resonant-frequencies.

19. The apparatus of claim 18, wherein the resonant spectra library is stored locally on the computer system.

20. The apparatus of claim 18, wherein the resonant spectra library is stored remotely on a centralized server to allow a plurality of computer systems to access the resonant spectra library.

21. The apparatus of claim 18, wherein the identification mechanism is configured to perform an in-situ vibration characterization for the computer system having the given component configuration.

22. The apparatus of claim 21, wherein the identification mechanism is configured to perform the in-situ vibration characterization by performing a swept sine test using a built-in vibration generator in the computer system.

23. The apparatus of claim 17, wherein the vibration sources include one or more of the following:

one or more fans within the computer system;

one or more hard disk drives within the computer system; and one or more tape drives within the computer system.

24. The apparatus of claim 18, wherein the control mechanism is configured to control the rotational speeds of the vibration sources to be different from the identified structural resonant frequencies of the computer system.

* * * * *